United States Patent [19]

Nishina et al.

[11] Patent Number: 5,036,934
[45] Date of Patent: Aug. 6, 1991

[54] ELECTRO MOTOR CAR

[76] Inventors: Edward T. Nishina, 78-6401 Mamalahoa Hwy., Holualoa, Hi. 96725; George Spector, 233 Broadway, Rm. 3815, New York, N.Y. 10007

[21] Appl. No.: 330,631

[22] Filed: Mar. 30, 1989

[51] Int. Cl.5 .............................................. B60K 25/10
[52] U.S. Cl. ................... 180/165; 180/65.1; 180/65.6
[58] Field of Search ............ 180/165, 65.3, 65.4, 180/65.6, 65.7

[56] References Cited

U.S. PATENT DOCUMENTS

| 1,557,570 | 10/1925 | Eckman et al. | 180/65.3 |
|---|---|---|---|
| 3,497,026 | 2/1970 | Calvert | 180/165 |
| 3,861,487 | 1/1975 | Gill | 180/65.3 |
| 3,981,204 | 9/1976 | Starbard | 180/65.3 |
| 4,095,665 | 6/1978 | Armfield | 180/65.3 |
| 4,218,624 | 8/1980 | Schiavone | 180/65.3 |
| 4,381,041 | 4/1983 | Butoi | 180/65.3 |
| 4,387,781 | 6/1983 | Ezell et al. | 180/65.3 |
| 4,694,706 | 9/1987 | Lichtenberg et al. | 74/502.4 |

FOREIGN PATENT DOCUMENTS

| 651202 | 2/1929 | France | 180/65.3 |
|---|---|---|---|
| 2268660 | 11/1975 | France | 180/65.3 |
| 326115 | 3/1930 | United Kingdom | 180/165 |

Primary Examiner—Andres Kashnikow
Assistant Examiner—Eric Culbreth

[57] ABSTRACT

An electromotor vehicle is provided which includes an energy converter and a power transmitting system that takes vertical movement from a wheel axle due to driving operation of the vehicle and converts it into rotational movement to operate a magneto generator which will produce electrical current to recharge a battery that supplies power to the vehicles drive assembly.

3 Claims, 1 Drawing Sheet

U.S. Patent
Aug. 6, 1991
5,036,934
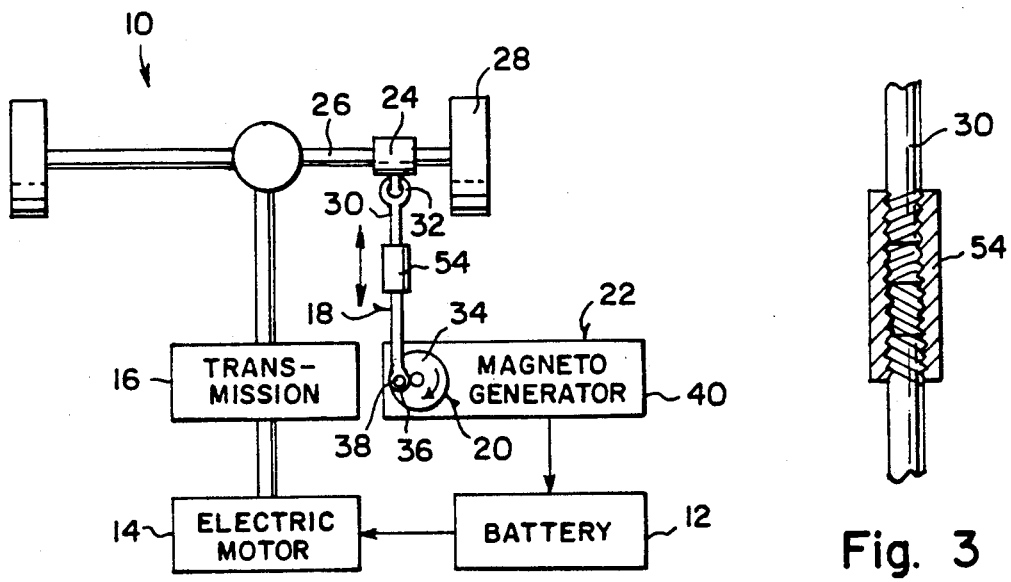
Fig. 1
Fig. 3
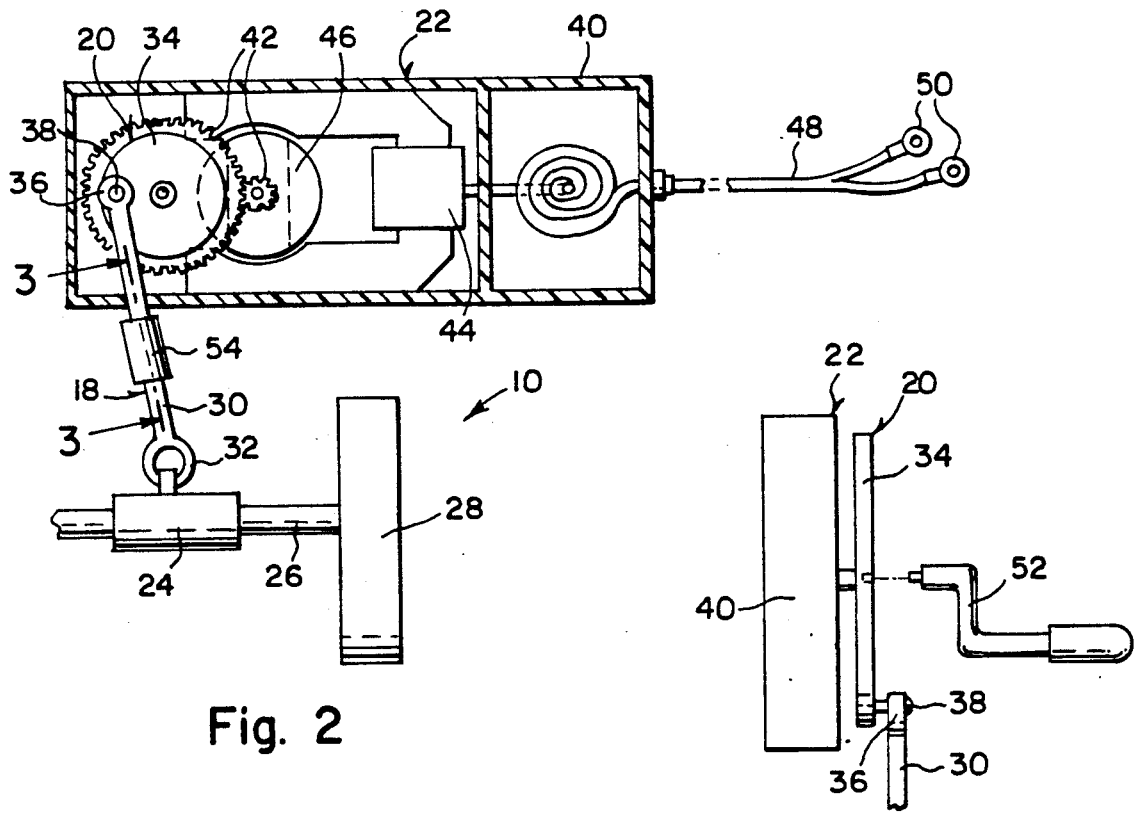
Fig. 2
Fig. 4

ELECTRO MOTOR CAR

BACKGROUND OF THE INVENTION

The instant invention relates generally to electric powered vehicles and more specifically it relates to an electromotor vehicle.

Numerous electric powered vehicles have been provided in prior art that are adapted to include motors which receive their power from storage batteries carried within the vehicle. For example, U.S. Pat. Nos. 4,095,665; 4,218,624 and 4,381,041 all are illustrative of such prior art. While these units may be suitable for the particular purpose to which they address, they would not be as suitable for the purposes of the present invention as heretofore described.

SUMMARY OF THE INVENTION

A primary object of the present invention is to provide an electromotor vehicle that will overcome the shortcomings of the prior art devices.

Another object is to provide an electromotor vehicle in which a magneto generator that is driven through a superfluous movement of the vehicle will produce electrical current to recharge a battery that supplies power to the vehicle drive assembly.

An additional object is to provide a electromotor vehicle which includes an energy converter and a power transmitting system that takes vertical movement from a wheel axle due to driving operation of the vehicle and converts it into rotational movement to operate the magneto generator.

A further object is to provide an electromotor vehicle that is simple and easy to use.

A still further object is to provide an electromotor vehicle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a top plan view in schematic form of the invention.

FIG. 2 is a cross sectional view of the magneto power source showing internal construction thereof.

FIG. 3 is a cross sectional view taken along line 3—3 in FIG. 2 showing the clamp in greater detail so that the magneto power source can be disconnected from the ring member.

FIG. 4 is an end view of the magento power source showing a removable crank arm whereby the magneto power source can be hand cranked for charging the battery.

DETAILED DESCRIPTION OF THE PREFERRED EMBODIMENTS

Turning now descriptively to the drawings, in which similar reference characters denote similar elements throughout the several views, FIGS. 1 and 2 illustrate a portion of an electromotor vehicle 10 utilizing a battery 12 as a source of electrical energy to supply power to a drive assembly, such as an electric motor 14 and transmission 16 of the vehicle 10.

The invention consists of an energy converter 18 for receiving superfluous movement of the vehicle 10 and produces a reciprocal movement from the superfluous movement. A power transmitting system 20 is for receiving and changing the reciprocal movement into a rotational movement. A generator 22 is for receiving the rotational movement anad producing an electrical current from the rotational movement to place electricity back into the battery 12.

The energy converter 18 consists of a ring member 24 situated about an axle 26 from wheel 28 of the vehicle 10. An adjustable rod assembly 30 is pivotally coupled at one end 32 to the ring member 24 to receive vertical movement of the axle 26 due to driving operation of the vehicle 10. The rod assembly 30 will transfer its reciprocal movement to the power transmitting system 20.

The power transmitting system 20 consists of a rotatable disc 34 carried on the generator 22 in which other end 36 of the rod assembly ispivotly coupled to pin 38 in an offset relationship on the disc 34.

The generator 22 includes a housing 40 and a gear system 42 carried in the housing 40 and is driven by the disc 34. A magneto 44 has a rotor 46 operated by the gear system 42 to produce the electrical current. The magneto 44 is electrically connected via cable 48 and terminal rings 50 to the battery 12 so as to recharge the battery.

A removable crank arm 52, shown in FIG. 4, can engage with the rotatable disc 34 to mechanically operate the gear system 42 when the rod assembly 30 is disconnected therefrom by turning a clamp 54 on the rod assembly 30 shown in FIGS. 1 and 3.

In operation the magneto generator 22 will recharge the battery 12 during movement of wheel axle 26 when the vehicle 10 is driven. This is accomplished by the energy converter 18 and power transmitting system 20 movably connected between wheel axle 26 and the magneto generator 22.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An electromotor vehicle utilizing a battery as a source of electrical energy to supply power to a drive assembly of the vehicle which comprises:
    (a) an energy converter for converting vertical movement of the vehicle and producing linear reciprocal movement from said vertical movement;
    (b) a power transmitting system for receiving and changing said linear reciprocal movement into a rotational movement; and
    (c) a generator for receiving the rotational movement and producing an electrical current form the rotational movement to place electricity back into the battery, wherein said energy converter comprises:
    (d) a ring member mounted about an axle from a wheel of the vehicle; and
    (e) said power transmitting system including a linearly adjustable rod pivotally coupled at one end to said ring member, wherein an opposite end of said rod assembly is pivotally coupled to a rotatable disc at a point off-center of said disc and wherein said disc is mounted on said generator.

2. An electromotor vehicle as recited in claim 1, wherein said generator comprises:
 (a) a housing;
 (b) a gear system carried in said housing and driven by said disc; and
 (c) a magneto in said housing having a rotor operated by said gear system to produce the electrical current, said magneto electrically connected to the battery so as to recharge the battery.

3. An electromotor vehicle as recited in claim 2, further comprising a removable crank arm which engages said rotatable disc to mechanically operate said gear system when said rod assembly is disconnected therefrom.

* * * * *